US007711635B2

(12) United States Patent
Steele et al.

(10) Patent No.: US 7,711,635 B2
(45) Date of Patent: May 4, 2010

(54) SYSTEM AND METHOD FOR HELPING CONSUMERS UNDERSTAND AND INTERPRET CREDIT SCORES

(75) Inventors: Michael Scott Steele, Berkeley, CA (US); Ethan J. Dornhelm, Greenbrae, CA (US); Sharon Hatcher Tilley, Larkspur, CA (US); Jeffrey Jue, Dublin, CA (US); Edward Koichi McAvoy, Foster City, CA (US)

(73) Assignee: Fair Isaac Corporation, Minneapolis, MN (US)

( * ) Notice: Subject to any disclaimer, the term of this patent is extended or adjusted under 35 U.S.C. 154(b) by 901 days.

(21) Appl. No.: 11/363,984

(22) Filed: Feb. 27, 2006

(65) Prior Publication Data

US 2006/0218067 A1 Sep. 28, 2006

Related U.S. Application Data

(63) Continuation-in-part of application No. 10/183,135, filed on Jun. 25, 2002, which is a continuation-in-part of application No. 09/790,453, filed on Feb. 22, 2001.

(60) Provisional application No. 60/656,742, filed on Feb. 25, 2005.

(51) Int. Cl.
*G06Q 40/00* (2006.01)

(52) U.S. Cl. ........................................................ 705/38

(58) Field of Classification Search ................... 705/35, 705/38, 76; 707/1, 100–104; 726/17–19; 709/201–203
See application file for complete search history.

(56) References Cited

U.S. PATENT DOCUMENTS

| | | | |
|---|---|---|---|
| 4,736,294 | A | 4/1988 | Gill et al. |
| 4,876,592 | A | 10/1989 | Von Kohorn |
| 4,895,518 | A | 1/1990 | Arnold et al. |
| 5,034,807 | A | 7/1991 | Von Kohorn |
| 5,259,766 | A | 11/1993 | Sack et al. |
| 5,262,941 | A | 11/1993 | Saladin |
| 5,611,052 | A | 3/1997 | Dykstra et al. |
| 5,615,408 | A | 3/1997 | Johnson et al. |
| 5,704,029 | A | 12/1997 | Wright |
| 5,732,400 | A | 3/1998 | Mandler et al. |

(Continued)

FOREIGN PATENT DOCUMENTS

EP 0913789 A 5/1996

(Continued)

OTHER PUBLICATIONS

Noe, "Credit Scoring", Aug. 1997, America's Community Banker, v6n8, pp. 29-33.*

(Continued)

*Primary Examiner*—Mary Cheung
(74) *Attorney, Agent, or Firm*—Mintz, Levin, Cohen, Ferris, Glovsky and Popeo, P.C.

(57) ABSTRACT

A system and method is provided that provides tools to consumers to help consumers understand their credit scores and how to take action to improve their credit scores. A system and method for each of and for a combination of a score estimating tool, a best action simulation tool, an easy error correction tool, and a score improvement tool are provided.

9 Claims, 12 Drawing Sheets

U.S. PATENT DOCUMENTS

| | | | | |
|---|---|---|---|---|
| 5,774,883 | A | 6/1998 | Anderson et al. | |
| 5,793,972 | A | 8/1998 | Shane | |
| 5,875,236 | A | 2/1999 | Jankowitz et al. | |
| 5,878,403 | A | 3/1999 | DeFrancesco et al. | |
| 5,930,764 | A | 7/1999 | Melchione et al. | |
| 5,930,776 | A | 7/1999 | Dykstra et al. | |
| 5,940,812 | A | 8/1999 | Tengel et al. | |
| 5,950,172 | A | 9/1999 | Klingman | |
| 5,966,695 | A | 10/1999 | Melchione et al. | |
| 5,995,947 | A | 11/1999 | Fraser et al. | |
| 6,029,149 | A | 2/2000 | Dykstra et al. | |
| 6,064,987 | A | 5/2000 | Walker et al. | |
| 6,070,141 | A | 5/2000 | Houvener et al. | |
| 6,088,686 | A | 7/2000 | Walker et al. | |
| 6,094,643 | A | 7/2000 | Anderson et al. | |
| 6,105,007 | A | 8/2000 | Norris | |
| 6,115,690 | A | 9/2000 | Wong | |
| 6,119,103 | A | 9/2000 | Basch et al. | |
| 6,128,599 | A | 10/2000 | Walker et al. | |
| 6,128,603 | A | 10/2000 | Dent et al. | |
| 6,324,524 | B1 | 11/2001 | Lent et al. | |
| 6,405,181 | B2 | 6/2002 | Lent et al. | |
| 6,567,791 | B2 * | 5/2003 | Lent et al. | 705/38 |
| 7,076,462 | B1 * | 7/2006 | Nelson et al. | 705/38 |
| 7,143,063 | B2 | 11/2006 | Lent | |
| 7,337,133 | B1 * | 2/2008 | Bezos et al. | 705/27 |
| 2001/0049672 | A1 * | 12/2001 | Moore et al. | 707/1 |
| 2002/0035511 | A1 * | 3/2002 | Haji et al. | 705/26 |
| 2002/0077964 | A1 | 6/2002 | Brody et al. | |

FOREIGN PATENT DOCUMENTS

| | | | |
|---|---|---|---|
| EP | 0869652 | A | 10/1998 |
| WO | WO 01/57720 | A3 | 8/2001 |

OTHER PUBLICATIONS

Singletary, M. "Score One for Open Credit Ratings." The Washington Post, Washington DC, Jun. 18, 2000, 3 pages.

Stanton, T.H. "Credit Scoring and Loan Scoring as Tools for Improved Management of Federal Credit Programs." Financier, Philadelphia, Summer 1999, vol. 6, 15 pages.

Data Validation Tips and Techniques; www.zdnet.com; Sep. 1, 1999.

Powerforms: Declarative Client-Side Form Field Validation; ISSN 13860145X; Dec. 2000.

Occasional CF Newsletter; http://www/halhelms.com/indexcfm?fuseaction=newlsetters.oct1999.

How Much Does a Low FICO Score Cost?, Jul. 14, 2000; http://ficobuiloder.com/kbsrch.htm.

Announcing TrueProfiler, Nov. 20, 2000; http://www.truecredit.com/index.asp.

TrueProfiler add on to any credit report for only $3.95, Nov. 20, 2000; https://www.truecredit .com/credit/TrueProfilerSample.asp.

FICO Guide Service, Nov. 20, 2000; https://www.ficoguide.com/sample_report.cfm.

Fw: Your ficobuilder.com order is here! Jul. 3, 2000.

Overview, Aug. 7, 2000; file:///Windy%20Hillo/Desktop%20Folder/Fair%20 Isacc%20explainer%20call%20Irene/CreditXpert%AA.

* cited by examiner

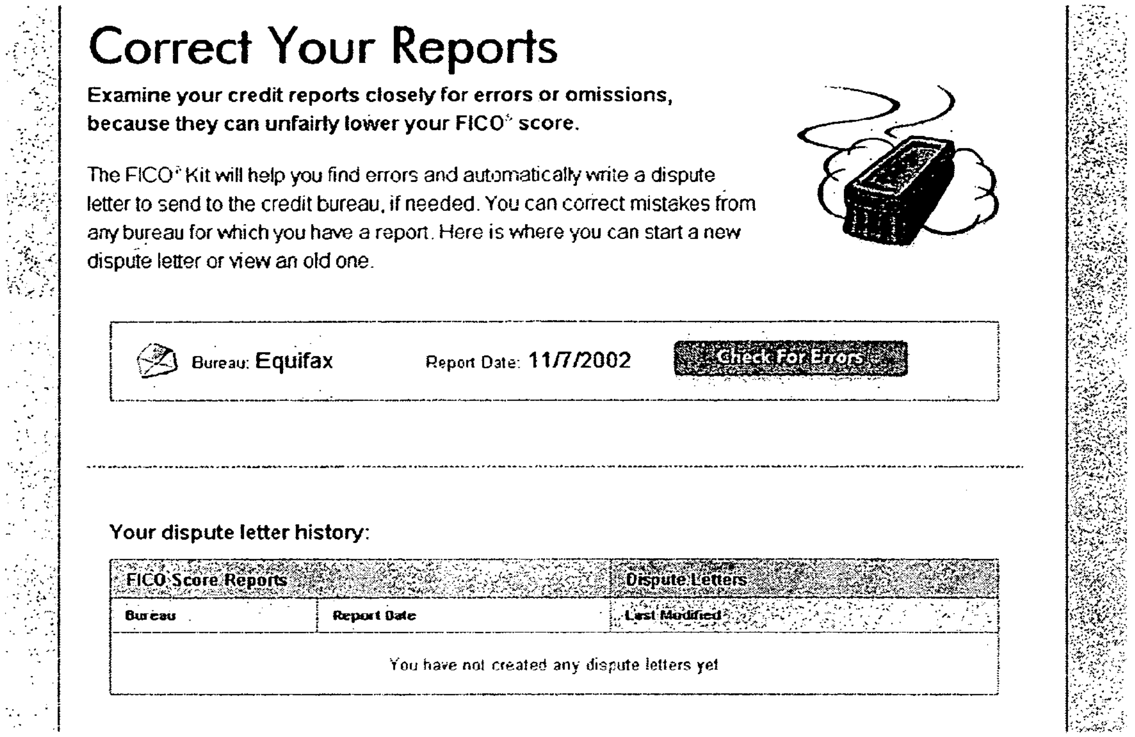

Figure 1

Correct Your Reports

Examine your credit reports closely for errors or omissions, because they can unfairly lower your FICO® score.

The FICO® Kit will help you find errors and automatically write a dispute letter to send to the credit bureau, if needed. You can correct mistakes from any bureau for which you have a report. Here is where you can start a new dispute letter or view an old one.

Bureau: Equifax Report Date: 11/7/2002 Check For Errors

Your dispute letter history:

| FICO Score Reports | | Dispute Letters |
|---|---|---|
| Bureau | Report Date | Last Modified |
| You have not created any dispute letters yet | | |

Figure 2

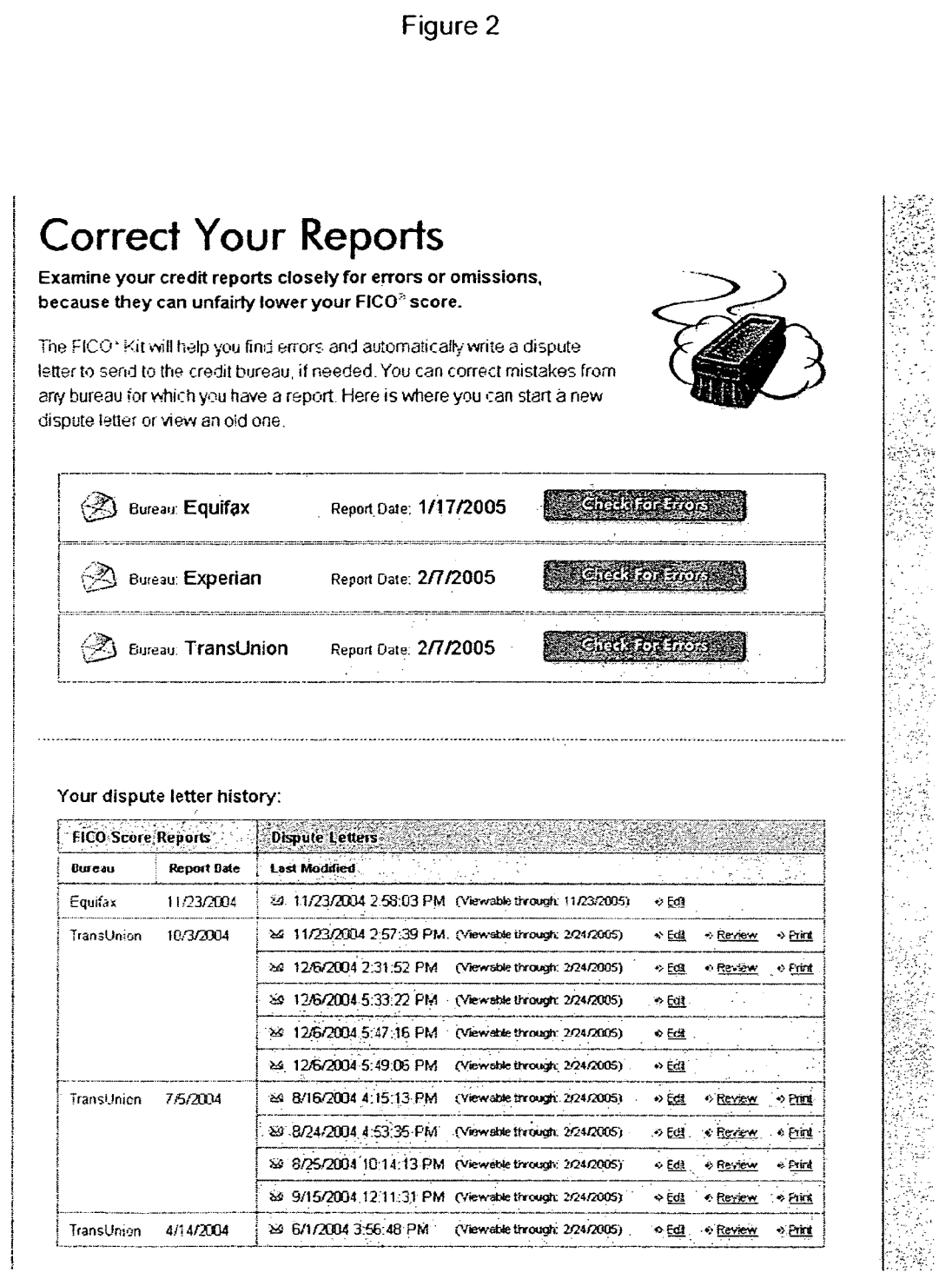

Correct Your Reports

Examine your credit reports closely for errors or omissions, because they can unfairly lower your FICO® score.

The FICO® Kit will help you find errors and automatically write a dispute letter to send to the credit bureau, if needed. You can correct mistakes from any bureau for which you have a report. Here is where you can start a new dispute letter or view an old one.

| | | |
|---|---|---|
| Bureau: Equifax | Report Date: 1/17/2005 | Check For Errors |
| Bureau: Experian | Report Date: 2/7/2005 | Check For Errors |
| Bureau: TransUnion | Report Date: 2/7/2005 | Check For Errors |

Your dispute letter history:

| FICO Score Reports | | Dispute Letters | | | | |
|---|---|---|---|---|---|---|
| Bureau | Report Date | Last Modified | | | | |
| Equifax | 11/23/2004 | 11/23/2004 2:58:03 PM | (Viewable through: 11/23/2005) | Edit | | |
| TransUnion | 10/3/2004 | 11/23/2004 2:57:39 PM | (Viewable through: 2/24/2005) | Edit | Review | Print |
| | | 12/6/2004 2:31:52 PM | (Viewable through: 2/24/2005) | Edit | Review | Print |
| | | 12/6/2004 5:33:22 PM | (Viewable through: 2/24/2005) | Edit | | |
| | | 12/6/2004 5:47:16 PM | (Viewable through: 2/24/2005) | Edit | | |
| | | 12/6/2004 5:49:06 PM | (Viewable through: 2/24/2005) | Edit | | |
| TransUnion | 7/5/2004 | 8/16/2004 4:15:13 PM | (Viewable through: 2/24/2005) | Edit | Review | Print |
| | | 8/24/2004 4:53:35 PM | (Viewable through: 2/24/2005) | Edit | Review | Print |
| | | 8/25/2004 10:14:13 PM | (Viewable through: 2/24/2005) | Edit | Review | Print |
| | | 9/15/2004 12:11:31 PM | (Viewable through: 2/24/2005) | Edit | Review | Print |
| TransUnion | 4/14/2004 | 6/1/2004 3:56:48 PM | (Viewable through: 2/24/2005) | Edit | Review | Print |

Look For Errors

Carefully examine your report for errors. I've already looked for some common errors for you below. You'll need to do the rest. Click on the box accompanying each item to check mark all errors. When you have finished, click "Next" to proceed. If you find no errors, you are now done and can return to Steps to Better Credit.

Back Next

Personal Information 312

Problems to look for:

- Incorrect information. Even small problems can cause your credit report to be confused with the report of another person.
- Outdated information. Perhaps you have married, divorced, or changed your name. Perhaps you have changed your phone number or switched jobs. If your credit report shows outdated information, you should update it.
- Missing employers. Lenders often look to an employment history as evidence of stability.

Check off items to fix

Current name: MEL G. KKOW

Former names: MEL METRISFILE

Report a former name that is not listed above.

Social Security Number: 584-42-2574

Date of birth: July 1, 1971

Phone number: Not on file (check box to add)

You should consider adding your current phone number to your report. Lenders often verify a telephone number as evidence of stability.

Employers: NO CUSTOMER INPUT; TEST APP; HOUSEHOLD

Report an employer that is not listed above.

Addresses 310

Problems to look for:

- Outdated or missing current address. Your credit report

Check off items to fix

Current address: 304 SYDNEY WY

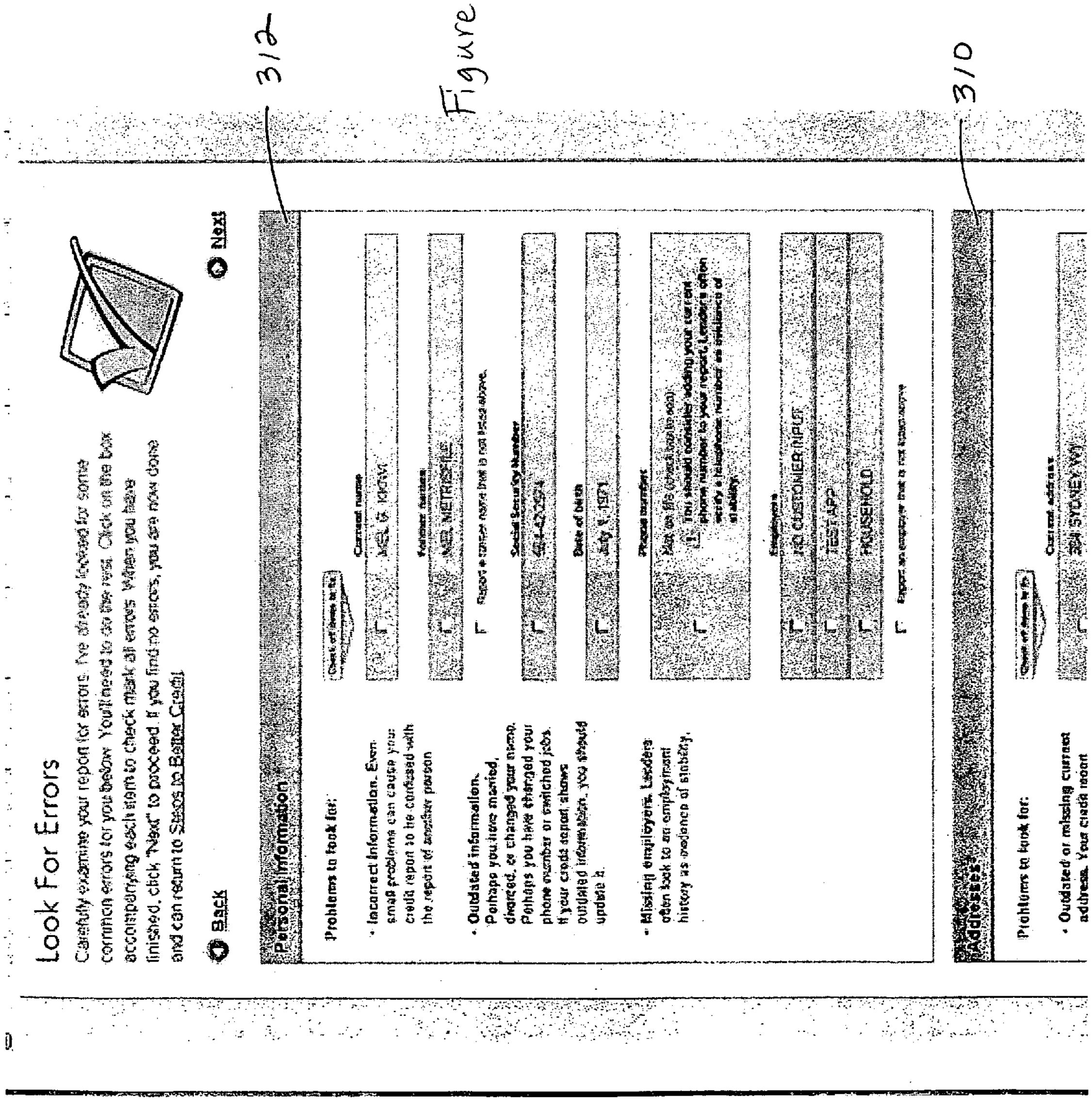

Figure 3a

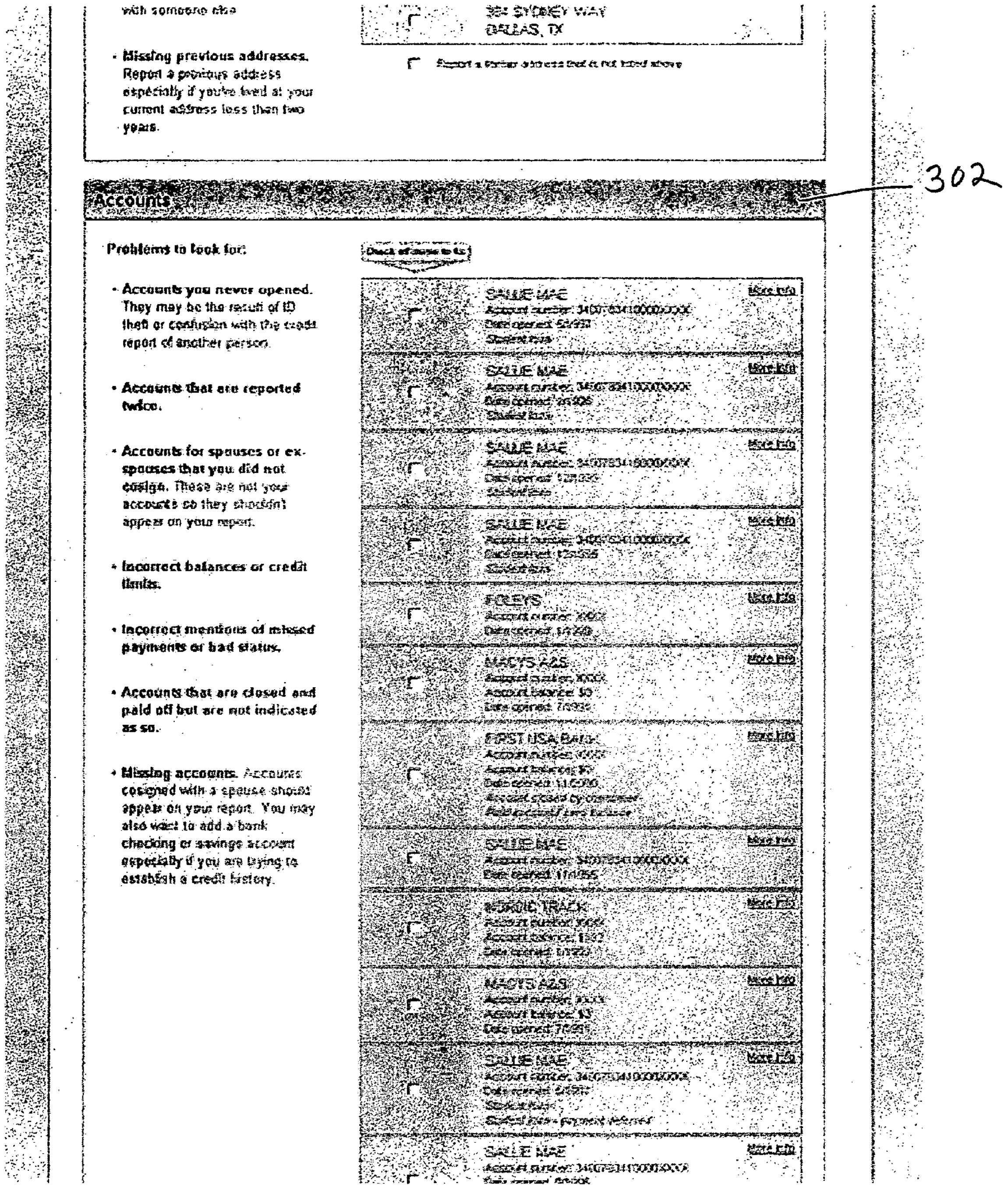

Figure 3b with someone else

- Missing previous addresses. Report a previous address especially if you've lived at your current address less than two years.

384 SYDNEY WAY
DALLAS, TX

Report a former address that is not listed above

Accounts — 302

Problems to look for:

- Accounts you never opened. They may be the result of ID theft or confusion with the credit report of another person.
- Accounts that are reported twice.
- Accounts for spouses or ex-spouses that you did not cosign. These are not your accounts so they shouldn't appear on your report.
- Incorrect balances or credit limits.
- Incorrect mentions of missed payments or bad status.
- Accounts that are closed and paid off but are not indicated as so.
- Missing accounts. Accounts cosigned with a spouse should appear on your report. You may also want to add a bank checking or savings account especially if you are trying to establish a credit history.

Check all that apply

SALLIE MAE — More Info

SALLIE MAE — More Info

SALLIE MAE — More Info

SALLIE MAE — More Info

FOLEYS — More Info

MACYS A&S — More Info

FIRST USA BANK — More Info

SALLIE MAE — More Info

NORDIC TRACK — More Info

MACYS A&S — More Info

SALLIE MAE — More Info

SALLIE MAE — More Info

Figure 5

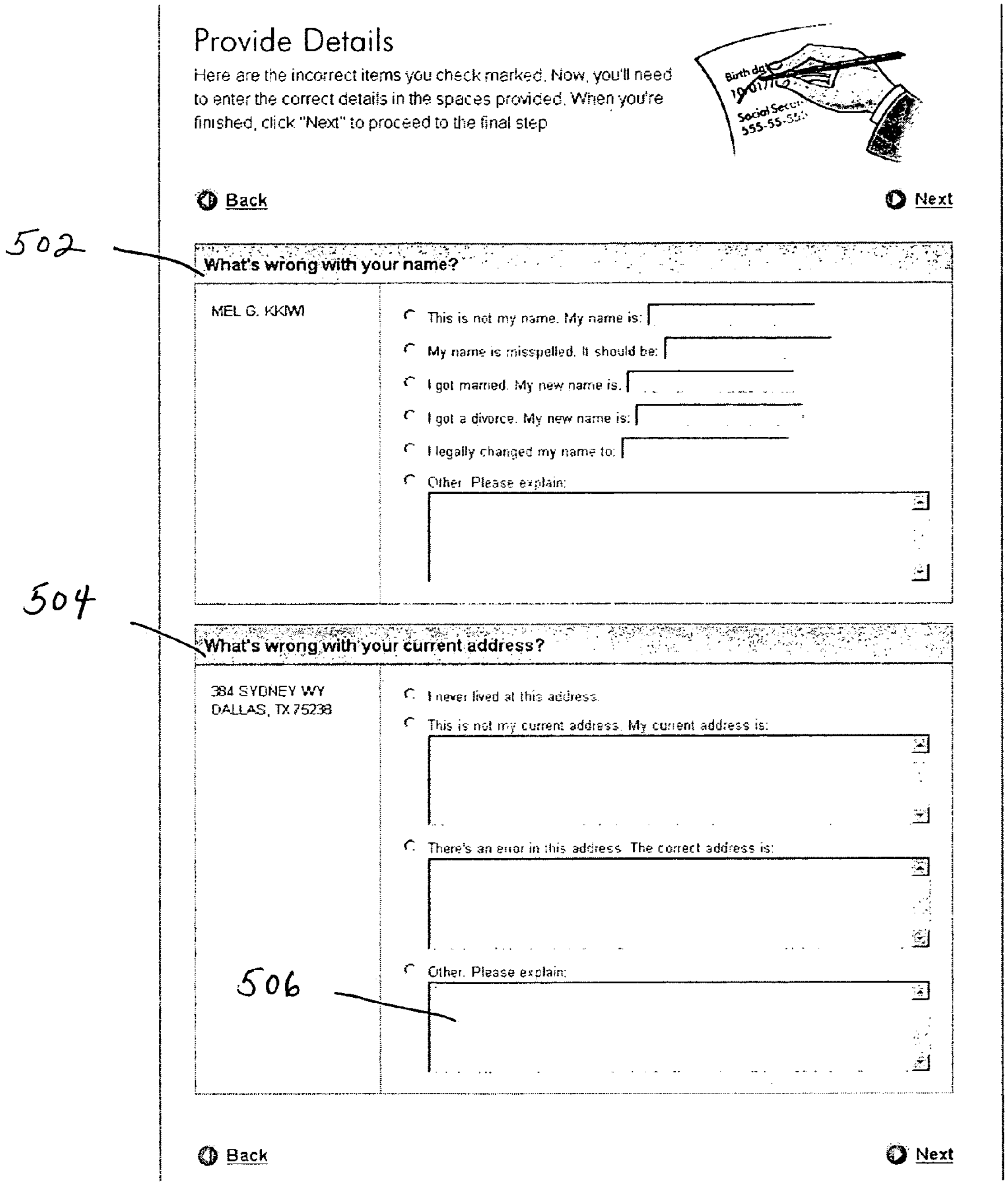

Provide Details

Here are the incorrect items you check marked. Now, you'll need to enter the correct details in the spaces provided. When you're finished, click "Next" to proceed to the final step Back Next

502

What's wrong with your name?

MEL G. KKIWI

- This is not my name. My name is:
- My name is misspelled. It should be:
- I got married. My new name is:
- I got a divorce. My new name is:
- I legally changed my name to:
- Other. Please explain:

504

What's wrong with your current address?

384 SYDNEY WY
DALLAS, TX 75238

- I never lived at this address.
- This is not my current address. My current address is:
- There's an error in this address. The correct address is:
- Other. Please explain:

506

Back Next

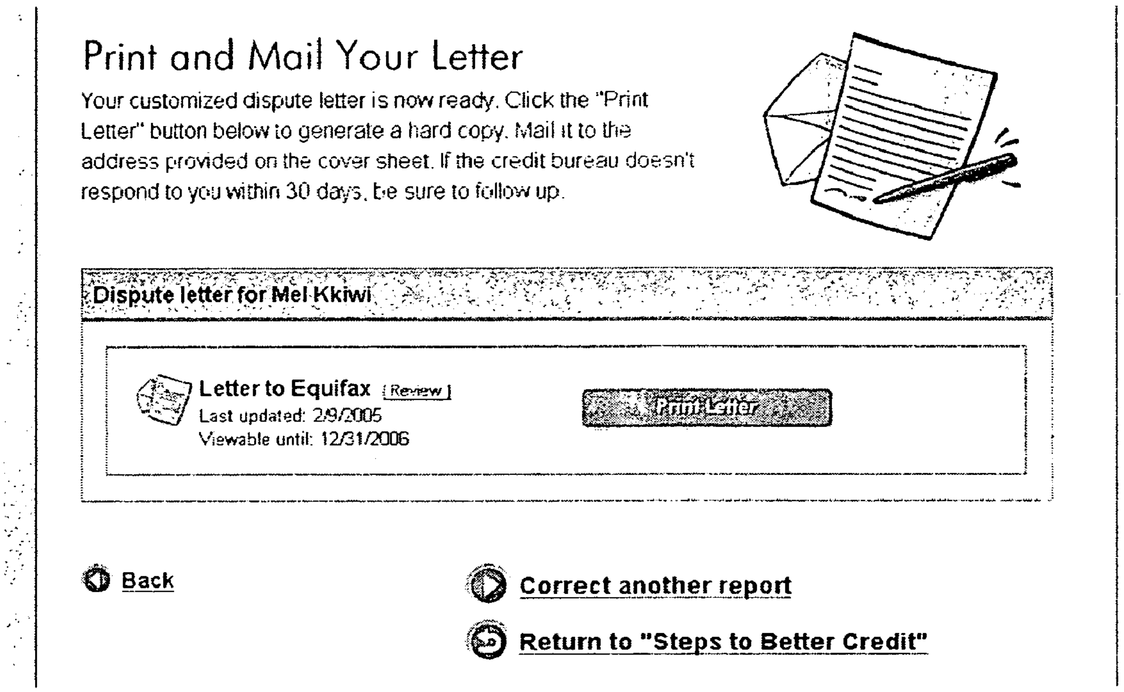

Figure 6

Print and Mail Your Letter

Your customized dispute letter is now ready. Click the "Print Letter" button below to generate a hard copy. Mail it to the address provided on the cover sheet. If the credit bureau doesn't respond to you within 30 days, be sure to follow up.

Dispute letter for Mel Kkiwi

Letter to Equifax [Review]
Last updated: 2/9/2005
Viewable until: 12/31/2006

Print Letter

Back

Correct another report

Return to "Steps to Better Credit"

Figure 7

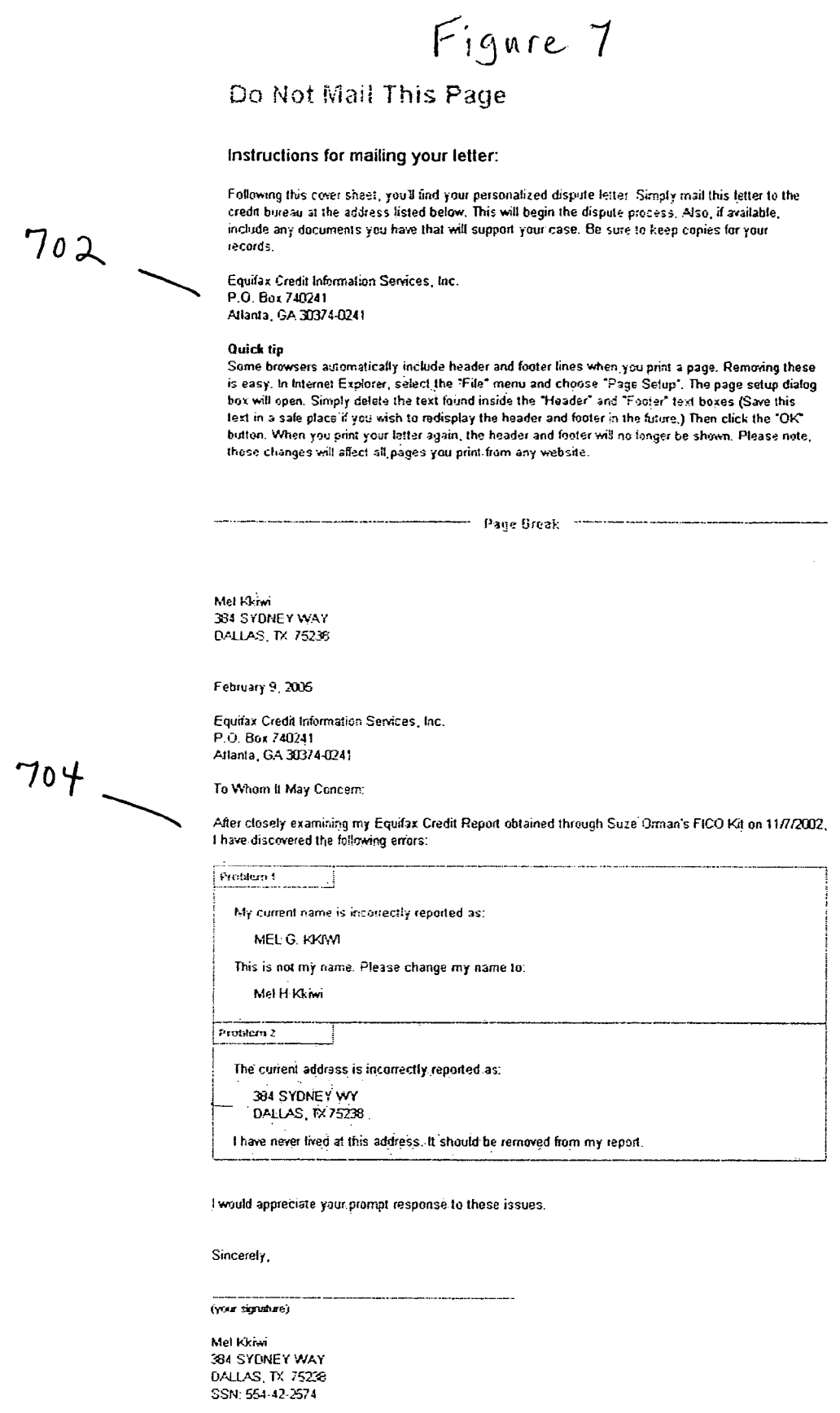

Do Not Mail This Page

Instructions for mailing your letter:

Following this cover sheet, you'll find your personalized dispute letter. Simply mail this letter to the credit bureau at the address listed below. This will begin the dispute process. Also, if available, include any documents you have that will support your case. Be sure to keep copies for your records.

702

Equifax Credit Information Services, Inc.
P.O. Box 740241
Atlanta, GA 30374-0241

Quick tip
Some browsers automatically include header and footer lines when you print a page. Removing these is easy. In Internet Explorer, select the "File" menu and choose "Page Setup". The page setup dialog box will open. Simply delete the text found inside the "Header" and "Footer" text boxes (Save this text in a safe place if you wish to redisplay the header and footer in the future.) Then click the "OK" button. When you print your letter again, the header and footer will no longer be shown. Please note, these changes will affect all pages you print from any website.

Page Break

Mel Kkiwi
384 SYDNEY WAY
DALLAS, TX 75238

February 9, 2006

Equifax Credit Information Services, Inc.
P.O. Box 740241
Atlanta, GA 30374-0241

704

To Whom It May Concern:

After closely examining my Equifax Credit Report obtained through Suze Orman's FICO Kit on 11/7/2002, I have discovered the following errors:

Problem 1

My current name is incorrectly reported as:

MEL G. KKIWI

This is not my name. Please change my name to:

Mel H Kkiwi

Problem 2

The current address is incorrectly reported as:

384 SYDNEY WY
DALLAS, TX 75238

I have never lived at this address. It should be removed from my report.

I would appreciate your prompt response to these issues.

Sincerely,

______________________________
(your signature)

Mel Kkiwi
384 SYDNEY WAY
DALLAS, TX 75238
SSN: 554-42-2574

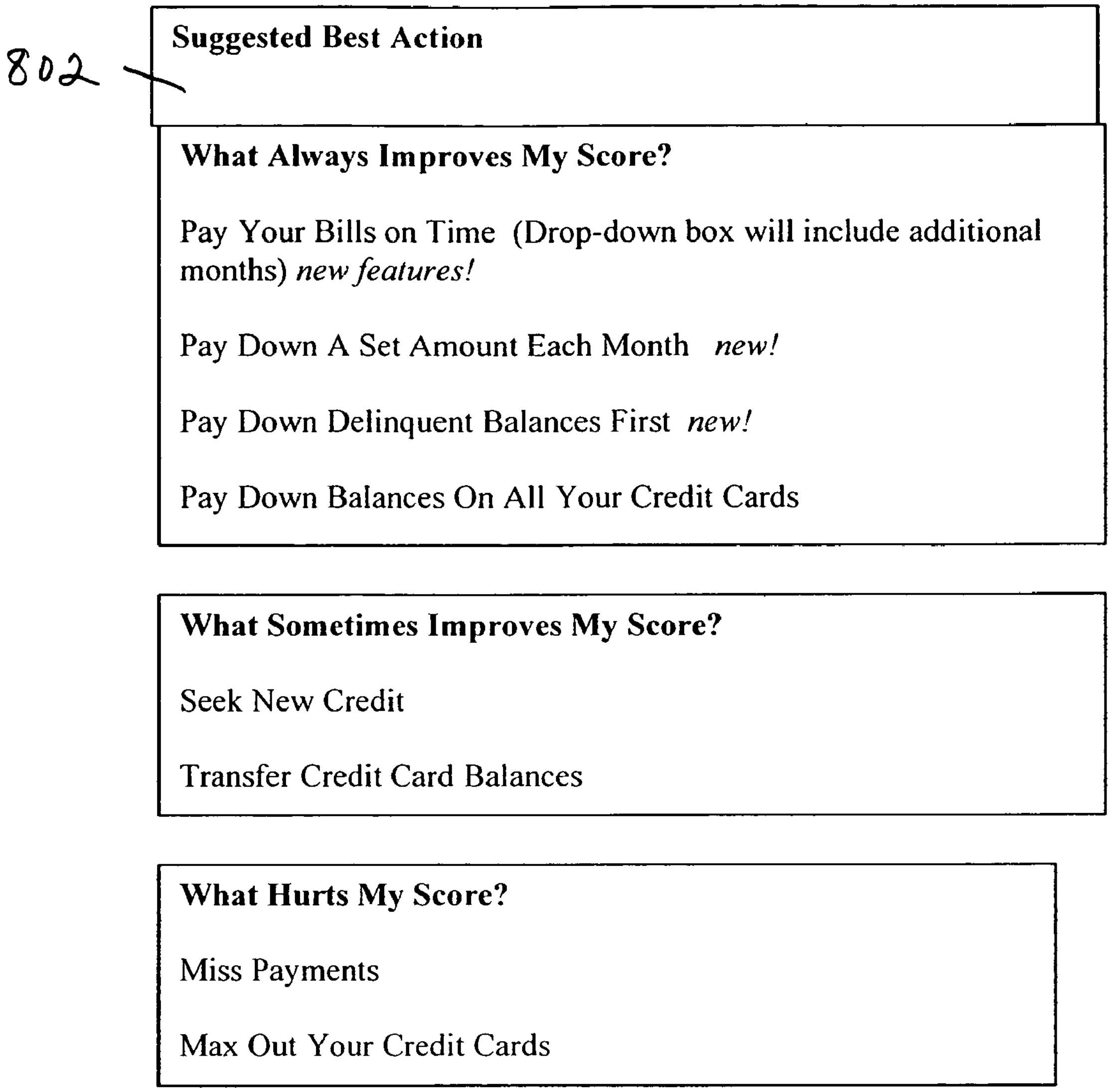

Suggested Best Action

What Always Improves My Score?

Pay Your Bills on Time (Drop-down box will include additional months) *new features!*

Pay Down A Set Amount Each Month *new!*

Pay Down Delinquent Balances First *new!*

Pay Down Balances On All Your Credit Cards

What Sometimes Improves My Score?

Seek New Credit

Transfer Credit Card Balances

What Hurts My Score?

Miss Payments

Max Out Your Credit Cards

SYSTEM AND METHOD FOR HELPING CONSUMERS UNDERSTAND AND INTERPRET CREDIT SCORES

CROSS-REFERENCE TO RELATED APPLICATIONS

This application claims priority to U.S. Provisional Patent Application Ser. No. 60/656,742, filed on Feb. 25, 2005, and is a continuation-in-part of U.S. patent application Ser. No. 10/183,135, filed on Jun. 25 2002, which is itself a continuation-in-part of U.S. patent application Ser. No. 09/790,453, filed on Feb. 22, 2001, each of which applications is incorporated herein in its entirety by this reference thereto.

BACKGROUND OF THE INVENTION

1. Technical Field

The invention relates to providing tools for consumers to aid them in understanding their credit scores and how to take action to improve their credit scores. More particularly, the invention relates to a score estimating tool, a best action simulation tool, an easy error correction tool, and a score improvement tool.

2. Description of the Prior Art

It is well known that when a consumer applies for credit, financial institutions look to three major credit bureaus to generate credit reports on that individual. They are Experian, Equifax, and TransUnion. Also used in evaluating the likelihood that a consumer will make good on his or her credit is a metric known as a credit score. Fair Isaac Corporation's FICO® score has become a standard score used in such evaluations. Given that consumers are becoming more and more technically and financially sophisticated, what is lacking are tools that keep up with such increase in sophistication. What is lacking are tools, put into the hands of consumers, that use data from actual bureau credit reports and actual FICO® scores of consumers to help them understand better how their behaviors affect their score and how to take action to improve their score.

It would be advantageous to provide a system and method that allows a user to easily dispute contents in bureau credit reports where logic component is linked to the user's actual credit report from the bureau.

It would be advantageous to provide a system and method that takes recent information from a consumer's credit reports as well as the consumer's credit score, e.g. FICO score, and generates a plan that the consumer can take to maximize the score.

It would be advantageous to provide a score estimator that allows consumers, by generating an estimate score, to glean a rough idea of their credit health. It would further be advantageous to configure such estimator such that it can be easily embedded into a partner's web site.

It would be advantageous to provide a system and method that determines the best action simulation, i.e. is the single most effective action of a set of actions to take by a consumer to increase the consumer's credit score.

SUMMARY OF THE INVENTION

A system and method is provided that provides tools to consumers to help consumers understand their credit scores and how to take action to improve their credit scores. A system and method for each of and for a combination of a score estimating tool, a best action simulation tool, an easy error correction tool, and a score improvement tool are provided.

BRIEF DESCRIPTION OF THE DRAWINGS

FIG. 1 is a screen shot for a first time user with one report available for correction according to the invention;

FIG. 2 is a screen shot showing for a user who has corrected reports before and has three reports available for correction according to the invention;

FIGS. 3*a*-3*d* are, when combined, one screen shot for the user that lists advice on common types of error for which to look according to the invention;

FIG. 5 is a screen shot of a page that lists a follow up question for each item the consumer selected to dispute in the previous page according to the invention;

FIG. 6 is a screen shot showing instructions for the user to print and mail the letter according to the invention;

FIG. 7 is an example of showing how the user is provided a page with instructions for mailing the letter and the letter itself according to the invention;

FIG. 8 shows simulations grouped in a particular order for the benefit of the consumer according to the invention.

DETAILED DESCRIPTION OF THE INVENTION

Figure 3C:
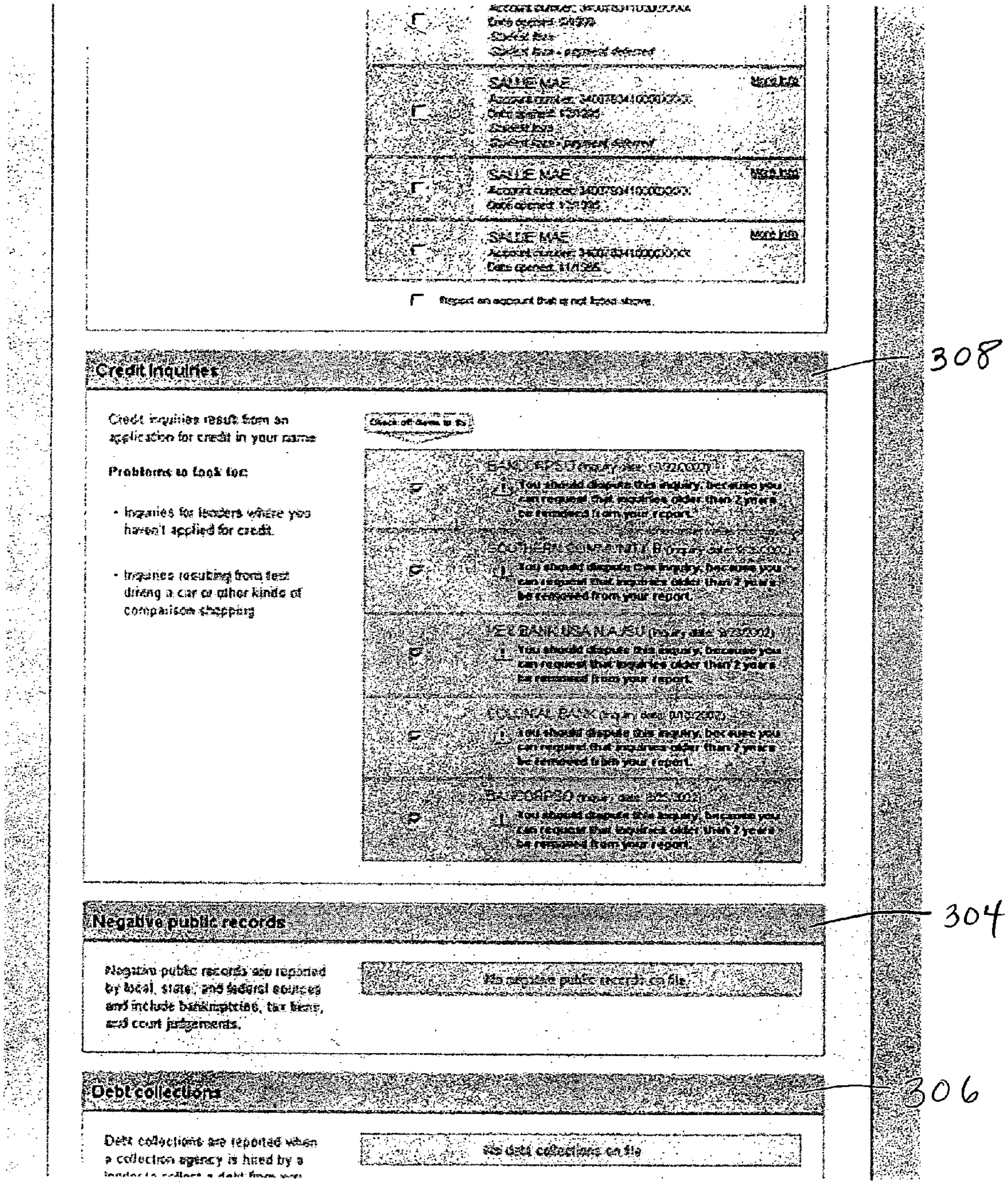
Figure 3D:
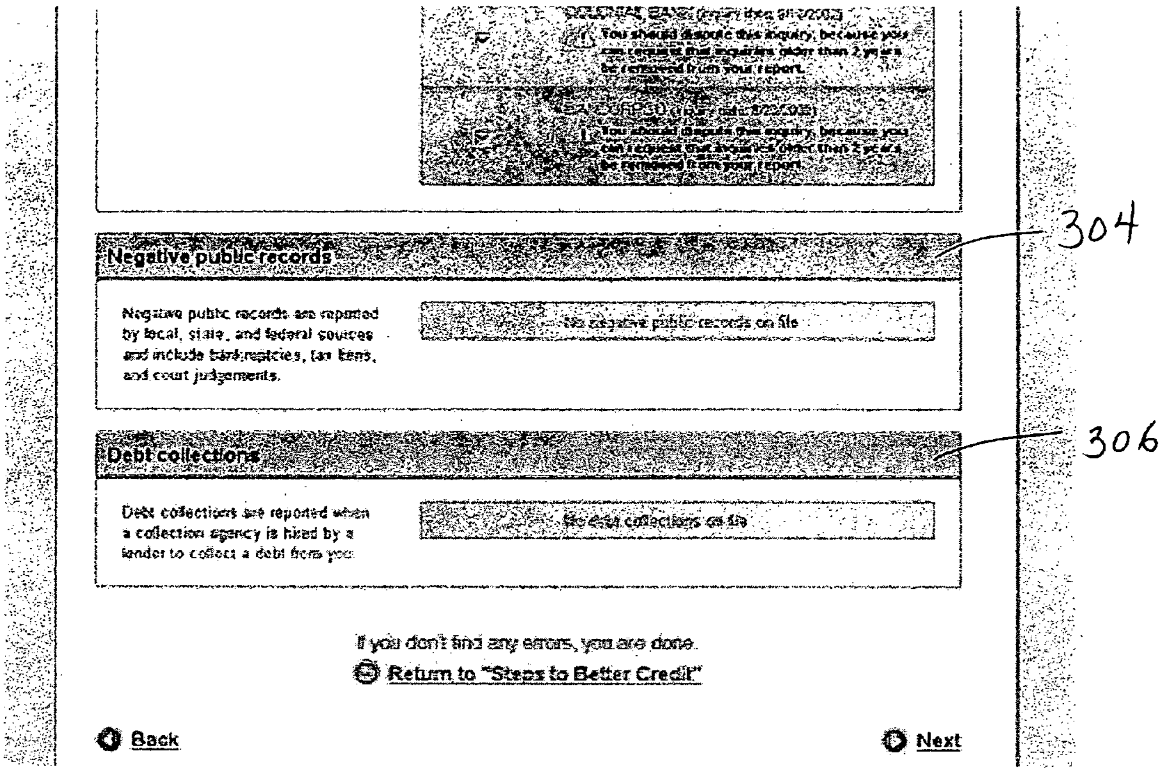

A system and method is provided that provides tools to consumers to help consumers understand their credit scores and how to take action to improve their credit scores. A system and method for each of and for a combination of a score estimating tool, a best action simulation tool, an easy error correction tool, and a score improvement tool are provided.

It should be appreciated that while each tool is described as a self-contained tool, each tool can be used in conjunction with any of the other tools.

An Exemplary EZ Error Correct

One embodiment of the invention provides a system and method for aiding the finding and disputing of errors on a consumer's credit report. While the description herein refers to present day facts, such as the credit reporting bureaus, Experian, Equifax, and TransUnion, it should be appreciated that this is by way of example only and that the system and method can be applied to any industry that has a need to assist a user in finding and disputing errors on an object.

In one embodiment of the invention, EZ Error Correct is a computer program that aids the finding and disputing of errors on a consumer's credit report(s). It should be appreciated that the name, EZ Error Correct, is meant by way of example only and is not meant to be limiting. It walks the consumer through their own credit report(s) with advice on what mistakes to look for, provides customized advice on what to dispute, follows up with questions about what is the correct information to provide to the credit bureau, and composes a dispute letter using data from the consumer's actual credit report(s).

In one embodiment of the invention, a method and system for executing the method is described as follows.

Obtaining a Credit Report

First, the consumer obtains their credit report from a credit bureau in an electronic form suitable for use in EZ Error Correct. For example, this can be done by pulling a credit report from either Equifax, Experian, or TransUnion credit bureaus on the myFICO web site. The consumer supplies some identifying information, such as name, address, date of birth, and social security number, as well as answers correctly a number of authentication questions, in order to pull their report on myFICO.

The credit report is delivered in a consumer raw format (FFF for Equifax, ARF for Experian, FFR for TransUnion) over the Internet to the myFICO database. A program called the consolidator then transforms this consumer raw format to an internal XML-based format which can be used as an input to EZ Error Correct.

Next, EZ Error Correct works with credit reports from either Equifax, Experian, or TransUnion. Each of the credit bureaus has their own unique Internet-based method for disputing information from one of their own reports. EZ Error Correct is unique in that it provides the same user interface for finding and disputing credit report errors, regardless of the credit bureau that is the source of the data.

In one embodiment of the invention, the following items are added to the credit report for the following categories:

Accounts;

Former Names;

Former Addresses; and

Employers.

Finding Mistakes in the Credit Report

Next, the consumer selects to start a new dispute letter for data from one of the credit bureaus. Referring to FIG. 1 and FIG. 2, the consumer's most recent credit report from that credit bureau is used as the basis of that dispute letter. FIG. 1 is a sample screen shot a first time user with one report available for correction. FIG. 2 is a sample screen shot for a user who has corrected reports before and has three reports available for correction.

Next, the consumer is shown a page that summarizes all the information on this credit report. Refer to FIGS. 3*a*-3*d*, a screen shot for the user, listing advice on common types of error for which to look. The page is broken up into a section for each type of information on the credit report; for example, there are separate sections for accounts 302, e.g. trade lines, public records 304, collections 306, inquiries 308, addresses 310, and personal information 312 like names and employers. Each section is split into a left side and a right side. The right side lists all the information from the credit report, the left side offers advice on what common types of mistakes to look for in this information.

For example, the inquiries section can list each inquiry on the credit report on the right side. On the left side are common mistakes to look for, such as inquiries from a company where the consumer has not applied for credit in the past 2 years. Such inquiries may not be listed on the credit report.

Figure 4:
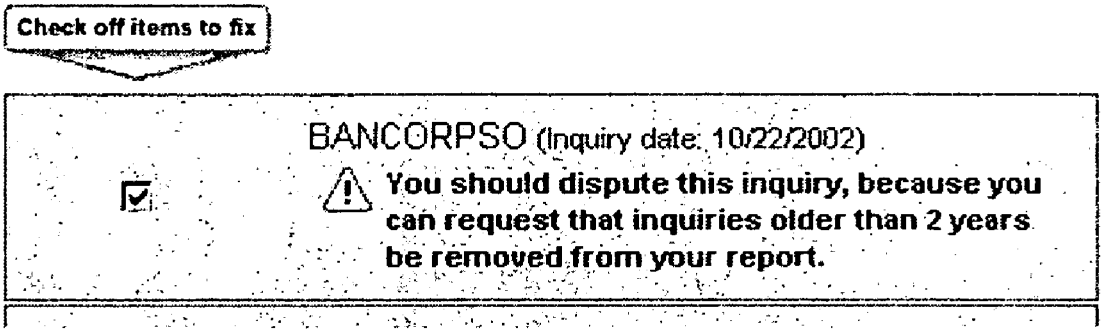
FIG. 4 is a screen shot of a graphical user interface object showing an example of a suggested correction according to the invention.

Next, EZ Error Correct implements some rules to flag certain information on the credit report as worthy of dispute or correction. For example, if an inquiry listed is older than 2 years old or if a collection listed is older than 7 years old, EZ Error Correct flags this item for the consumer by displaying it in bright yellow with a warning icon and displaying a message recommending that the consumer dispute this item. If no employers are listed on the credit report, EZ Error Correct flags the empty list of employers and recommends that the consumer supply information about their current employer. Refer to FIG. 4, a graphical user interface object showing of an example of a suggested correction.

In one embodiment of the invention, the following expired report items on the credit report is flagged for the user:

Inquires: if they are older than 2 years;

Records Bankruptcy: if they are older than 10 years; and

Records of all others: for example, delinquencies if they are older than 7 years.

It should be appreciated that each item from the credit report is accompanied by a checkmark button. To select an item to dispute, the consumer simply clicks its checkmark button so that a checkmark appears. After selecting all items to dispute, the consumer clicks a Continue button to proceed to the next step.

Next, if the user finds no errors here, they can quit the dispute process now.

Follow Up Questions

Referring to FIG. 5, the next page to appear lists a follow up question for each item the consumer selected to dispute in the previous page. The follow up question is "What is wrong with this item?" In FIG. 5 it is "What is wrong with your name?" 502 and "What is wrong with your current address?" 504. The follow up question comes with either buttons and/or textboxes for the user to provide the answer. The buttons or textboxes provided depends on the type of item to dispute.

The most common answers for the question "What is wrong with this item?" are provided as buttons. For example, if an account is in dispute, buttons are provided for the following kinds of errors:

I didn't open this account. This is not my account.

I only have one of this account. It's double reported.

This is my spouse's account. I did not cosign for this debt.

The account balance is incorrect. It should be: $ [ ]

The credit limit is incorrect. It should be: $ [ ]

I have closed this account and repaid everything I owed.

This makes it easy for the user to select a response as it is simply a matter of clicking a button and possibly entering a number into a textbox.

An Other choice with a large textbox 506 is also offered as an answer to the question "What is wrong with this item?" in case the user needs to explain an unusual situation.

Composing the Dispute Letter

EZ Error Correct now has all the information it needs to compose a dispute letter for the user to mail to the credit bureau. Referring to FIG. 6, EZ Error Correct takes the incorrect information from the credit report itself, the user's answer as to why the item is incorrect, and the correct information that the user has provided, and composes a paragraph in the letter with all these details.

EZ Error Correct provides and implements logic to explain what is wrong with the item, and the wanted correction for it. It phrases this in a way that makes sense to the person reading the letter at the credit bureau and provides the appropriate supporting details.

EZ Error Correct offers facilities to print this letter and advice on how to mail this to the credit bureau. Referring to FIG. 7, the user is provided a page with instructions for mailing the letter 702. The letter for mailing 704 is provided to the user.

Accessing Old Dispute Letters

Also, EZ Error Correct provides users access to their old dispute letters as well as allows users to create new dispute letters on new credit reports.

Alternative Embodiments

Following is a list of contemplated alternate embodiments and enhancements of the invention, not in any particular order:

Creating controls out of the tables on the checklist page;

Turning the html formatted sections of certain classes, e.g. the FicoScoreReport class, into controls;

Handling multiple database connections on one page;

Creating a proactive selection page where the user is presented with an analysis of possible trouble spots and correctable items in his report. Messages display for any items that fit the expired criteria listed above. Checkboxes on a category level allow the user to act upon issues that are not tied to a single item;

Creating a printable version of the report to link to from EZ correct. The disputed items are highlighted. Means for shrinking and condensing the length of the report;

With some kinds of credit report mistakes, raising a dispute with the creditor reporting this information rather than the credit bureau because it may be quicker. In this case, logic detects this situation and automatically composes a letter for sending directly to the creditor; and Offering support for any follow up needed if the credit bureau rejects the initial dispute. For example, compose a letter giving reasons why the initial dispute should not have been rejected.

An Exemplary FICO Improvement Plan

One embodiment of the invention provides a system and method that helps the consumer realize an action plan to improve his credit score, e.g. his FICO score.

One embodiment of the invention provides a plan that lists the actions a consumer should take to maximize the consumer's score. It is customized for the consumer, based on the information from the consumer's most recent credit reports. Then, at some other point in time and after the consumer gets a new credit or FICO score along with a credit report from any bureau, the invention can provide the consumer with an automatic update based on the new information.

Table A hereinbelow is an example plan for a Mr. Vlad Losev that is produced by one embodiment of the invention.

TABLE A

| |
|---|
| Plan generated for: Vlad Losev<br>Date created: Mar. 7, 2004<br>Based on: Equifax report (Feb. 19, 2004)<br>{#1 box bottom:} The single most important thing you can do.<br>{#2 box bottom:} The second most important thing you can do.<br>{After the plan}<br>Now that you are empowered with the knowledge of what you must do to maximize y FICO score, use that power to make a change.<br>It is always possible to begin again, to remake your life your way. |

Table B hereinbelow is an example letter to a consumer in lieu of the plan where the consumer did not receive any negative reason codes from any report.

TABLE B

| |
|---|
| Congratulations, Vlad!<br>Your FICO score is very good. Fewer than one out of ten people have a FICO score as high as yours. Most people would see in this space a personalized plan for how to take action to improve their FICO score. But you clearly know how to manage your credit responsibly, so there are no suggestions for improvement at this time.<br>If you get a FICO score in the future that is not so good, come back here for personalized suggestions on how to take action to improve it. |

One embodiment of the invention provides an algorithm to determine which action plan out of a number of action plans to display and in what order. First, the algorithm:

Takes negative reason codes from each of the most recent credit reports; and

Looks up the action plan appropriate for each reason code from each bureau.

By way of example, Table C shows, for a fictitious consumer, a list of reason codes and the appropriate action plan for each reason code per each credit bureau, respectively. In this implementation, there are nine action plans available to display. Their detailed explanations are provided hereinbelow.

TABLE C

| NEGATIVE REASON CODES | EFX | TU | EXP |
|---|---|---|---|
| 1 | A | A | A |
| 2 | B | B | B |
| 3 | G | D | G |
| 4 | I | . . . | I |
| 5 | A | A | A |
| 6 | I | I | I |
| 7 | F | F | F |
| 8 | H | H | H |
| 9 | H | H | H |
| 10 | A | A | A |
| 11 | A | A | A |
| 12 | F | F | F |
| 13 | B | B | B |
| 14 | F | F | F |
| 15 | G | G | G |
| 16 | G | G | G |
| 17 | G | G | G |
| 18 | B | B | B |
| 19 | . . . | H | . . . |
| 20 | E | E | E |
| 21 | C | C | C |
| 22 | E | E | E |
| 23 | A | | A |
| 24 | G | G | G |
| 25 | D | | D |
| 26 | I | I | I |
| 27 | | . . . | |
| 28 | . . . | . . . | . . . |
| 29 | H | G | G |
| 30 | H | H | H |
| 31 | G | C | G |
| 32 | . . . | | . . . |
| 33 | D | | D |
| 34 | C | | C |
| 38 | E | E | E |
| 39 | E | E | E |
| 40 | E | E | E |
| 97 | | G | |
| 98 | G | H | G |
| 99 | | | G |

By way of example, in this implementation, the Action Plans and their respective weights are provided as follows:

A—Pay down balances (weight: 1.4);

B—Don't miss payments (weight: 1.3);

C—Dealing with accounts that are late or in bad status (weight: 1.6);

D—Dealing with a newly started installment loan (weight: 1.4);

E—Dealing with a serious delinquency, public record or collection (weight: 2);

F—Establishing a credit history (weight 1.4);

G—Show Activity on accounts, or open a new account (weight: 1.0);

H—Stop applying for new credit (weight: 1.5); and

I—Close an account, especially credit/charge card or consumer finance account (weight: 1.6).

Then, the algorithm proceeds to:

Sum up the number of times each action plan is called for by the occurrence of a negative reason code for a certain credit bureau;

Multiply this number by the weight for the action plan; the resulting metric is the importance of each action plan; and List every action plan that is indicated, i.e. can be of any importance, but order them on the page with highest importance, i.e. metric, first.

If there are no negative reason codes from any report, then show an appropriate message, for example the one in Table B hereinabove, instead of the How to Take Action to Improve Your Score plan.

Following is a list of example action plans and their detailed explanations. It should be appreciated that these are by way of example only and are not meant to be limiting.

{A—Pay down balances}

Pay Down the Balances on Your Credit Accounts.

Paying down the balances on your credit accounts will likely help your FICO score. It is especially important to keep balances on your credit cards low.

Remember balances are reported on credit cards even if you pay them off every month. If you always pay off your balance every month, try paying cash for most of your purchases to improve your FICO score. Avoid running up any large balance on your cards, even if you pay it off immediately.

{B—Don't miss payments}

Don't Miss or be Late With Your Payments to any Credit Account.

It looks like you've been late on some payments before. Your payment history counts toward 35% of your FICO score . . . so stay disciplined with your payments.

If you can't make a large payment to pay down your credit cards, at least make the minimum payments on time. If you must be late on a payment to any credit account, send in the payment as soon as possible, preferably no later than 30 days past due. The longer you are late, the more your FICO score will go down.

If you ran into a spell of bad luck, such as an illness or a job loss, that caused you to be late with a payment recently, then try calling up the creditor, explain the situation, and ask for your account to be "re-aged". This procedure is called a goodwill adjustment and would remove the late payment from your credit report and could help your FICO score. This is a last resort option, however, since asking for a goodwill adjustment can be time-consuming, and ultimately it is at the creditor's discretion whether or not to honor your request for one.

If you are forgetful at times, consider using automatic bill pay to make payments to your mortgage, auto loan, student loan, or even credit cards. This is a service now offered by most banks, often for free. With little extra effort, your payments will always go out on time.

{C—Dealing with accounts that are late or in bad status}

Clean up any Accounts That are Currently Past Due or Showing Problems.

It appears you have at least one account that is past due, so the creditor is sending negative reports about you to the credit bureau.

You must fix your problem accounts if you want your FICO score to improve. The most effective way to fix them is to get "current", meaning to pay back everything you're obligated to pay back at this point in time. Then, stay current. Continue to make your payments, complete and on time.

If you cannot pay back your past-due debts, your next step should be to phone up the creditor and explain why your debt is late. If you will have the money in two weeks, or can send only $25, say so. In any case, it's important that you call your creditors before they call you.

{D—Dealing with a newly started installment loan}

Use a New Installment Loan to Demonstrate you Can Handle Credit Responsibly.

You have a relatively newly established installment loan, perhaps a mortgage, auto loan, or small business loan. Any new loan can hurt your FICO score shortly after it's opened, since taking on new credit is often a sign of increased financial risk for some people. However, it is an opportunity to improve your FICO score over the long run by demonstrating that you can make the payments on this installment loan consistently and on time.

You can improve your FICO score more quickly if you pay off this installment loan ahead of schedule. This will lower your balance relative to the loan principal, which will benefit your FICO score.

{E—Dealing with a serious delinquency, public record or collection}

Don't Let Serious Negative Marks Ruin Your FICO Score.

You have at least one serious negative mark on your credit report. Sometimes these negative marks on your credit report are wrong. If you are the victim of identity theft, you may not be aware there is a problem until you see a negative mark like this on your credit report. Also, perhaps a collection agency is attempting to collect money from you as the result of mistaken identity. If this is the case, you should dispute these negative marks immediately.

If the negative mark is accurate, then there is no quick fix to improving your FICO score. The best action you can take is to start managing your credit better from now on. A FICO score can be forgiving of mistakes in the past. Time heals all wounds, and that includes wounds to your FICO score. But you must show responsible use of credit in the recent past to make amends for irresponsible behavior in the distant past. Whatever you do, don't let another negative mark torpedo your FICO score again.

{F—Establishing a credit history}

Your FICO Score can Improve as Your Credit History Ages

People who have a long-lasting credit history that demonstrates responsible use of credit have higher FICO scores than people who have only recently begun to use credit or use credit very rarely.

Your credit history begins when you open up your first credit account—it could be a charge card, credit card, auto loan, or student loan. Once you have this account opened, take extreme care to pay it on time and keep it in good standing, because you must make a good first impression and prove that you can manage credit responsibly when it is extended to you.

Be aware of applying for too much credit too quickly in the year or two after starting your credit history, as this is an ominous sign to creditors and can lower your FICO score.

Once you've begun your credit history, time is on your side. A longer credit history helps your FICO score. For this reason, be very careful about closing the accounts that you have had for the longest time. If the credit bureau stops reporting these accounts, your credit history will become shorter and that could ding your FICO score.

{G—Show Activity on accounts, or open a new account}

Demonstrate More Activity with Your Credit

Your credit history shows minimal recent activity, which is lowering your FICO score somewhat.

You can show more activity by charging to a charge card or credit card that you do not normally use. Make a small purchase on the card and pay off the balance as soon as you get your statement. The card company will then likely report the new activity to the credit bureaus, and this should help your FICO score.

If you do not have any open credit accounts at all, you may want to consider opening one to show recent activity, especially a bankcard. Remember that a FICO score favors those who have credit and demonstrate they can use it responsibly over those who never make use of credit at all. Opening a credit account can lower your FICO score in the short term, that is, the next six months to a year. But if you do not have any other open credit accounts, this action can improve your FICO score in the long term so long as you make your payments consistently and on time.

{H—Stop applying for new credit}

Show Restraint on Applying for New Credit

It looks like you've been applying for new credit in the recent past. Applying for and opening new credit accounts can hurt your FICO score in the short term, typically the six months to year after opening the new account.

There are many situations where applying for new credit makes sense—when you need the credit (for example, to apply for an auto loan to buy a car that you need), to start establishing a credit history, or to transfer your credit card balances to a card with a lower interest rate.

However, be careful about applying for any kind of credit in the six months before you need to apply for a large loan, such as a mortgage or auto loan.

One more tip: if you are comparison shopping for a new auto loan or mortgage, great, but try to apply for all the alternatives within a few weeks, instead of strung out over many months. Multiple applications for auto or mortgage credit will hurt your FICO score less if they come nearly at the same time.

{I—Don't Stop using extra credit cards}

Stop Using Extra Credit Cards you don't Need.

While credit cards are a great convenience, opening up too many of them can hurt your FICO score. Your best strategy at this point is to stop using extra credit cards you don't need. However, don't call the credit card companies to close the extra accounts. Closing an unused credit card does not help your score, and in many cases can hurt your score. Also, closing an account does not cause it to be removed from your credit report. Instead, pay down any outstanding balance on the extra account, and then just let the account sit unused. Eventually the inactive account will fall off your credit report.

Of course, for many of us, having some extra, unused credit cards open can make it too easy to overspend and get ourselves into trouble. Bearing in mind that closing such accounts could lower your score, if you've decided to do this in order to reduce your temptation, pick and choose among your accounts according to these guidelines:

Keep credit accounts with higher limits

Keep your older account(s) open

Leave at least one credit card account open

An Exemplary Score Estimator

One embodiment of the invention provides a score estimator that decouples the consumer's score from the consumer's credit report. In this way, the consumer can quickly get an idea of what his score is likely to be. In one embodiment of the invention, the score estimator is configured to be embedded in a partner's web site.

In one embodiment of the invention, the score estimator, also referred to herein for convenience as the FICO Score Estimator or simply the Estimator, is a customer acquisition tool whereby consumers are able, e.g. at no charge, to get an approximate idea of their FICO score. The Estimator is a calculator, typically free, to give consumers a rough idea of their credit health. Consumers can be referred to the myFICO web site to get an actual FICO score and personalized recommendations on how to take action to improve it.

In one embodiment of the invention, the FICO Score Estimator is designed to be easily hosted by licensee sites. The Estimator can be implemented using HTML and client side javascript. Sites that license the Estimator are provided with generic HTML and javascript source code that they can embed within their site pages.

The Estimator can benefit businesses in at least the following ways. It can generate traffic from licensee sites. It can be licensed to high-traffic portals and other strategic partners.

The FICO Score Estimator can be made up of both files that are distributed to licensee sites for integration into their site as well as javascript and image files that are hosted on servers at Fair Isaac and referenced by pages hosted on the licensee sites.

In one embodiment of the invention, the HTML that makes up the Estimator UI is modifiable by the licensee sites in order to make it fit the feel of their sites. The javascript code that generates the Estimator results can be hosted, such as at Fair Isaac for example, such that this code can be modified if necessary without having to redistribute to licensee sites.

An Exemplary Table of FICO Credit Score Test Results

Table D hereinbelow shows an example table that stores the FICO Credit Score Test results data for the Estimator. In this implementation, each participant is assigned a unique participant ID. Each participant may take the test one or more times. Each test's results is assigned a unique test ID.

TABLE D

| Column Name | Data Type | Column Description |
|---|---|---|
| participant_id | Uniqueidentifier | Participant ID |
| test_id | Uniqueidentifier | Test ID |
| q1_answer | Char(1) | Answer for question 1 |
| q1a_answer | Char(1) | Answer for question 1a |
| q2_answer | Char(1) | Answer for question 2 |
| q3_answer | Char(1) | Answer for question 3 |
| q4_answer | Char(1) | Answer for question 4 |
| q5_answer | Char(1) | Answer for question 5 |
| q6_answer | Char(1) | Answer for question 6 |
| q7_answer | Char(1) | Answer for question 7 |
| q7a_answer | Char(1) | Answer for question 7a |
| q8_answer | Char(1) | Answer for question 8 |
| q8a_answer | Char(1) | Answer for question 8a |
| q9_answer | Char(1) | Answer for question 9 |
| q10_answer | Char(1) | Answer for question 10 |
| q10a_answer | Char(1) | Answer for question 10a |
| fico_score | Integer | FICO score |
| score_method | Integer | Scoring method (algorithm) |
| email | Varchar (80) | Email address |
| opt_in_flag | Char(1) | Email opt in flag |
| fi_link_partner_id | Char(30) | Link partner ID |
| fi_source_id | Varchar (20) | BeFree source ID |
| fi_merchant_id | Varchar (10) | BeFree merchant ID |
| fi_affiliate_id | Varchar (50) | BeFree affiliate ID |
| fi_experiment_id | Varchar (50) | Experiment ID |

where:

Input/Output Parameters participant_id Uniqueidentifier test_idUniqueidentifier

Input Parameters q1_answer Char (1)

q1a_answer Char (1)

q2_answer Char (1)

q3_answer Char (1)
q4_answer Char (1)
q5_answer Char (1)
q6_answer Char (1)
q7_answer Char (1)
q7a_answer Char (1)
q8_answer Char (1)
q8a_answer Char (1)
q9_answer Char (1)
q10_answer Char (1)
q10a_answer Char (1)
fico_score Integer
score_method Integer
email Varchar (80)
opt_in_flag Char (1)
fi_link_partner_id Char (30)
fi_source_id Varchar (20)
fi_merchant_id Varchar (10)
fi_affiliate_id Varchar (50)
fi_experiment_id Varchar (50)

High Level Process Flow

If the participant ID is null, a new participant ID and test ID are generated and returned and a new record is inserted. If the participant ID is not null and the test ID is null, a new test ID is generated and a new record is inserted. If neither the participant ID nor the test ID are null, an existing record is updated. All other circumstances return an error. It is assumed that all input columns are assigned their current values on each call of the procedure.

Desired Requirements

In one or more embodiments of the invention, some requirements are desired, detailed as follows:

The FICO Estimator is a tool licensed to select myFICO distribution partners and is engineered for maximum portability and/or ease of integration into partner's web sites.

The FICO Estimator includes a series of multiple-choice questions, e.g. 12 on one or two screens, and produces the FICO score range that the consumer is most likely to map into.

Score ranges are at least plus or minus N points, such as 25 points.

The FICO score range result page displayed to the consumer can include a graphical depiction of the FICO score distribution bar. The lower and upper end of the range includes percentiles to give an idea of where the consumer stands vs. the population. Alternatively, the consumer can be shown where the consumer stands vs. common lender pricing cut-offs. The results page can depend in part on strategic partner input.

The FICO score range result page can include educational and promotional text and a unique-tracking link to the myFICO web site.

The actual display and/or layout of the result page can be designed by the licensee while the enterprise, e.g. Fair Isaac, can maintain control of the appearance of other features such as the score range bar.

Process Descriptions

One embodiment of the invention provides several key processes in the FICO Score Estimator. These processes are used in the calculation of an estimated FICO score, and are outlined in detail hereinbelow. It should be appreciated that implementation details are by way of example only and are not meant to be limiting.

GENERATE FICO SCORE ESTIMATOR CHARACTERISTICS: In this process, the user is asked a series of questions, such as multiple-choice questions, pertaining to the user's credit usage and payment history. The user's answers are stored as input characteristics and are fed into the calculation of the user's estimated FICO score. An example implementation of this process can be found in Table E, at the end of this section hereinbelow.

GENERATE TIME SINCE OLDEST ACCOUNT OPENED: In this process, an additional FICO Score Estimator Characteristic that is used in the calculation of the estimated FICO score is generated. The additional characteristic is "TIME SINCE OLDEST ACCOUNT OPENED", and it is generated without any additional user input, meaning the characteristic is generated by using the user's answers asked in the process hereinabove. Example questions, the answers of which are used in this process follow:

How long ago did you get your first credit card?

How long ago did you get your first loan?

DETERMINE EXCLUSION CODE: In this process, the user's responses are evaluated to determine whether the user has sufficient credit history to receive a valid FICO score. For example, if the user answers "I have never had a loan or credit card" to any question, or indicates that they opened their first credit card or loan less than 6 months ago, the process of estimating their FICO score is exited, and the following text is returned:

"We cannot estimate your FICO score. In order to get your FICO® Credit Score Estimate you must have at least one account which has been open for six months or more. This requirement is designed to ensure that there is sufficient recent information to provide a robust and accurate FICO® score estimate."

DETERMINE ESTIMATOR SCORE ALGORITHM IDENTIFIER: In this process, the user's answers to certain questions are evaluated to determine which of two empirically derived scorecards is more appropriate to use in estimating that user's FICO score.

A scorecard is defined here as an algorithm for estimating the FICO score by assigning points to the user based on the user's responses to the series of questions pertaining to the user's credit usage and payment history. As users can differ greatly in their credit usage and payment history, the appropriate number of points to assign to a user for a given response may vary depending on the user's credit profile. For example, in one embodiment of the invention, two scorecards can be developed for estimating FICO score for two very different groups of users. This process determines which of the two groups the user belongs to, and by extension, which of the two scorecards should be used to estimate the user's FICO score.

In one implementation of the invention, the two scorecards are differentiated based on having estimator score algorithm identifier values, e.g. such as 81 or 82. The user's answers to the following questions are used in the determination of the user's estimator score algorithm identifier:

What percent of your total credit limits do your credit card balances represent?

When did you last miss a loan or credit card payment?

What is the most delinquent you have ever been on a loan or credit card payment?

Please indicate if you have ever gone through any of the following negative financial events: bankruptcy, tax lien, foreclosure, repossession, or account referred to collection agency.

CALCULATE INTERIM FICO ESTIMATOR SCORE: In this process, the user's initial estimated FICO score is calculated. This is accomplished by assigning points to the user based on a combination of their Estimator Score Algorithm Identifier and the user's responses to the series of questions pertaining to the user's credit usage and payment history. The points assigned to the user for each of the responses are then summed up to determine the initial estimated FICO score.

CALCULATE FINAL FICO ESTIMATOR: In this process, the user's initial estimated FICO score is rounded to the nearest 5 to create the Final Estimated FICO Score. As an example, for initial estimated FICO score values between 650-659:

- an initial estimated FICO score value of 650, 651, or 652 becomes 650
- an initial estimated FICO score value of 653, 654, 655, 656, 657 becomes 655
- an initial estimated FICO score value of 658 or 659 becomes 660

CALCULATE FICO ESTIMATOR SCORE RANGE AMOUNTS: In this process, a low range and high range are calculated for the user's estimated FICO score by applying a confidence interval. For example, a confidence interval of +/−25 points can be applied to the Final Estimated FICO Score. The resulting low range and high range are then quoted back to the user as the score range in which the user's FICO score is expected to fall.

As an example, if a user's Final Estimated FICO Score is calculated to be 655, then the low range is calculated as 655 minus 25 (630), and the high range is calculated as 655 plus 25 (680), and the resulting score range of 630 to 680 is quoted back to the consumer as follows:

"Your FICO Scores are estimated to be between: 630-680".

TABLE E

| PROCESS: GENERATE FICO SCORE ESTIMATOR CHARACTERISTICS |
|---|
| Populate the __characteristic__# revolving/open trade lines__with the user response to the question:<br>"How many credit cards do you have?"<br>Populate the __characteristic__months since oldest revolving/open date opened__with the user response to the question:<br>"How long ago did you get your first credit card?"<br>Populate the __characteristic__months since oldest installment date opened__with the user response to the question:<br>"How long ago did you get your first loan?"<br>Populate the __characteristic__# inquiries 0-11 months__with the user response to the question:<br>"How many loans or credit cards have you applied for in the last year?"<br>Populate the __characteristic__months since most recent date opened__with the user response to the question:<br>"How recently have you opened a new loan or credit card?"<br>Populate the __characteristic__# trade lines with balance >0__with the user response to the question:<br>"How many of your loans and/or credit cards currently have a balance?"<br>Populate the __characteristic__total usual balances__with the user response to the question:<br>"Besides any mortgage loans, what are your total balances on all other loans and credit cards combined?"<br>As an example, let's say you have two accounts:<br>one auto loan with balance of $7,000<br>one credit card with balance of $1,500<br>Your total balances on all non-mortgage accounts would be: $8,500 ($7,000 + $1,500).<br>Populate the __characteristic__months since last delinquency__with the user response to the question:<br>"When did you last miss a loan or credit card payment?"<br>Populate the __characteristic__maximum delinquency ever__with the user response to the question:<br>"What is the most delinquent you have ever been on a loan or credit card payment?"<br>Populate the __characteristic__# currently delinquent trade lines__with the user response to the question:<br>"How many of your loans and/or credit cards are currently past due?"<br>Populate the __characteristic__total balance on all currently delinquent trade lines__with the user response to the question:<br>"What are your total balances on all currently past due accounts?"<br>Populate the __characteristic__net fraction revolving/open burden__with the user response to the question:<br>"What percent of your total credit limits do your credit card balances represent?"<br>As an example, let's say you have two credit cards:<br>one with balance of $250 and limit of $1,000<br>one with balance of $750 and limit of $4,000<br>Your total credit card balances would be $1,000 ($250 + $750), your total credit limits would be $5,000 ($1,000 + $4,000), and the percent of your total credit limits that your credit card balances represent are: $1,000 divided by $5,000, or 20%.<br>Populate the __characteristic__negative financial event flag__with the user response to the question:<br>"Please indicate if you have ever gone through any of the following negative financial events: bankruptcy, tax lien, foreclosure, repossesion, or account referred to collection agency."<br>Populate the __characteristic__months since most recent negative financial event__with the user response to the question:<br>"If so, how long ago did the most recent negative event occur?" |

An Exemplary Best Action Simulation

One embodiment of the invention uses the actual credit report of the consumer to obtain the score. The system and method then simulates different situations to see how each simulation affects score. In this way, the system and method provides a way to capture the universe of all possible actions a consumer can take. The best action, also referred to herein as the best action simulation, is the single most effective action to take to increase one's score. In an alternate embodiment of the invention, the consumer is provided with a choice of the top three best actions from which to select. It should be appreciated that there is a variety of best actions to present to the consumer depending on particular business requirements.

In one embodiment of the invention, a system and method is provided to add a new simulation option to a set of simulations, existing or newly generated, to determine the best action. A business layer is added as a public interface method for each of the individual simulations, including the best action simulation.

A Best Action Algorithm

In one embodiment of the invention, simulation calculations are run in a particular order. Table G herein below shows an example of a list of ordered simulations that can be used for a Best Action Simulation according to the invention. In this particular example, the simulations that require a pay down amount are looking at whether or not there is a value greater than zero in the Total Revolving Open Balances variable. If the value of this is less than zero, the algorithm does not execute the pay down balances because such would not return a valid score range.

The Best Action is determined by which simulation returns the Highest score range first. So, referring to Table F, if simulation #3 and simulation #60 return the same high value, then simulation #3 is indicated as the best action.

TABLE F

| | |
|---|---|
| 1. | simID 1124—Pay Bills on Time for X Months |
| 2. | simID 335—Pay Down Y % of Your Credit Card Balances Over Z Months |
| N. | simID 315—Pay Down T % of Your Credit Card Balances |
| N + M. | simID 322—Pay Down S % of Your Delinquent Credit Card Balances |

Table G is pseudocode showing the steps of an algorithm to obtain the best action simulation according to one embodiment of the invention.

TABLE G

| Rough Spec to Calculate "Optimal Simulation" Amongst All Simulation Options |
|---|
| 1) initialize maxscore = 0, simmaxID = 0; |
| 2) Run Simulation with simID = 1124 (list of ordered simulations to run and corresponding simIDs can be found at bottom of this table) — simulation 1124 returns a low score range value and a high score range value; |
| 3) set maxscore = high score range value for sim 1124, set simmaxID = 1124; |
| 4) Run Simulation with simID = 335; |
| 5) if high score range value for sim 335 > maxscore, set maxscore = high score range value for sim 335and set simmaxID = 335; |
| 6) repeat steps 4 and 5 for all remaining simulations listed below; and |
| 7) surviving simmaxID value is the simulation that is returned to the consumer as the action that could yield the biggest increase in score among the actions listed. |

In one embodiment of the invention, each of the existing simulations is mutually exclusive and uses generated predictive characteristics, such as those discussed in the U.S. patent application Ser. No. 10/183,135, filed on Jun. 25, 2002, which has been incorporated herein in its entirety hereto, as input. Some of the simulations, such as simulation 1, 5, 7, 8, 9 and 11, also use an input parameter along with the generated characteristics in order to determine the new score ranges based on the selected simulation. For the Best Action, the data in the generated characteristics are used to determine the input parameters for a simulation that requires additional input.

Possible Alternate Embodiments of the Invention from a Consumers perspective

- Apply any combination of the existing simulations. This is similar to the Best Action however, design the combinations around a consumer action of purchasing or obtaining more credit, for example.
- Determine a set of cumulative simulations, e.g. pay bills on time and pay down N amount.
- Add new single action simulations. Such option can involve analytic input on how to modify the Generated Characteristics. For example, perhaps consolidate balances to a home equity loan instead of a credit card.
- Graph a set of simulations that might encompass several consumer actions over a period of time. For example, what action would get the consumer to the next FICO score level up, e.g. to get a lower interest rate, or what action(s) would get the consumer to the next FICO score level down, e.g. buying a car or mortgage.

Referring to FIG. 8 there is shown a template for simulations grouped in a particular order for the benefit of the consumer. The top most simulation is the best action simulation 802.

Figure 9:
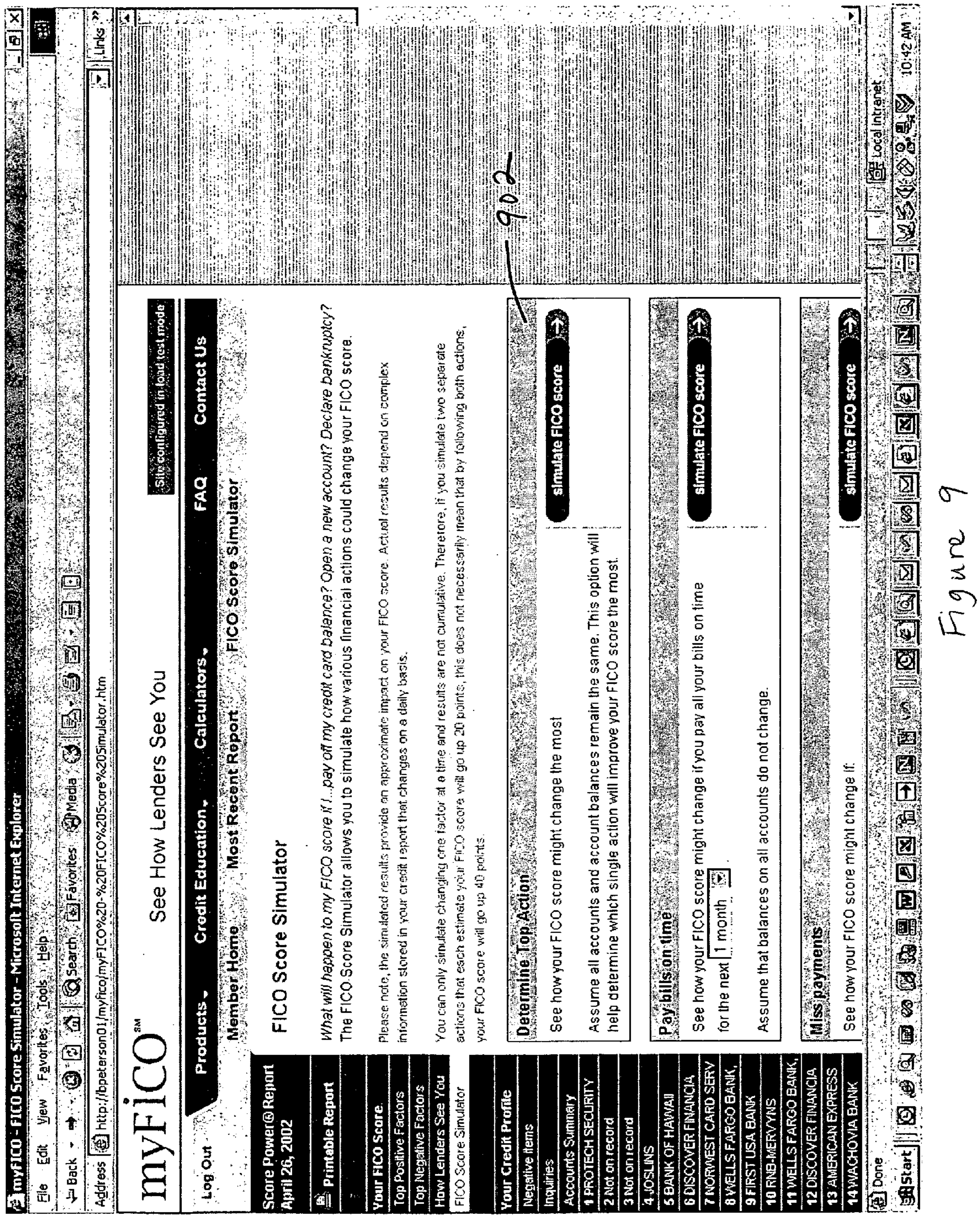
FIG. 9 shows a screen shot of the best action simulation as an option among other simulations according to the invention.

Referring to FIG. 9 there is shown a screen shot showing the best action simulation 902 as an option among other simulations according to one embodiment of the invention.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A computer implemented method for estimating a credit score for a consumer that gives the consumer an idea of the consumer's credit health, comprising the steps of:

distributing to a partner site one or more files, corresponding to a score estimator tool, for integration into a partner's web site, wherein said score estimator tool generates a score estimator characteristics from the one or more files on said partner site, generates months since oldest date opened associated with the consumer accessing the score estimator tool, determines an exclusion code associated with the calculating code, determines an estimator score algorithm identifier for an estimator score of the score estimator tool, calculates an interim estimator score for the estimator score, calculates a final estimator score for the estimator score, and calculates an estimator score range amounts for the estimator score;

hosting one or more other files on a host server, wherein said one or more hosted files are referenced by said distributed one or more files on said partner's web site;

wherein said one or more files on said partner site can be modified as desired by the partner to fit the partner's web site look and feel; and wherein said one or more hosted files comprise calculating code and wherein said calculating code can be updated on the host without requiring redistributing the updates to the partner's web site.

2. The method of claim 1, wherein said score estimator tool can be run many times by a single participant.

3. The method of claim 1, wherein said score estimator tool comprises a series of multiple-choice questions.

4. The method of claim 1, wherein said score estimator tool produces a score range within which a consumer's score is most likely to be.

5. The method of claim 1, wherein said score estimator tool provides a results web page wherein the layout of the page can be designed by the partner and other controls of the appearance is designed by the host.

6. The method of claim 1, further comprising the step of:

using said estimated credit score in find a best action simulation.

7. The method of claim 1, further comprising the step of:

helping a consumer realize an action plan to improve said estimated credit score.

8. The method of claim 1, further comprising the step of:

aiding the finding and disputing of errors on said credit report.

9. A system on a computer network for estimating a credit score for a consumer that gives the consumer an idea of the consumer's credit health, comprising:

means for distributing to a partner site one or more files, corresponding to a score estimator tool, for integration into a partner's web site, wherein said score estimator tool generates a score estimator characteristics from the one or more files on said partner site, generates months since oldest date opened associated with the consumer accessing the score estimator tool, determines an exclusion code associated with the calculating code, determines an estimator score algorithm identifier for an estimator score of the score estimator tool, calculates an interim estimator score for the estimator score, calculates a final estimator score for the estimator score, and calculates an estimator score range amounts for the estimator score;

means for hosting one or more other flies on a host server, wherein said one or more hosted files are referenced by said distributed one or more files on said partner's web site;

wherein said one or more files on said partner site can be modified as desired by the partner to fit the partner's web site look and feel; and wherein said one or more hosted files comprise calculating code and wherein said calculating code can be updated on the host without requiring redistributing the updates to the partner's web site.

* * * * *